United States Patent [19]

Gramss

[11] Patent Number: 5,772,062
[45] Date of Patent: Jun. 30, 1998

[54] INLET TRAY OF A CAR TANK

[75] Inventor: Rainer Gramss, Dorfäcker, Germany

[73] Assignee: ITW-Ateco GmbH, Norderstedt, Germany

[21] Appl. No.: 628,425

[22] Filed: Apr. 5, 1996

[30] Foreign Application Priority Data

May 13, 1995 [DE] Germany .......................... 195 17 705.3

[51] Int. Cl.[6] .................................................. B62D 25/00
[52] U.S. Cl. .......................... 220/335; 220/582; 220/86.2;
220/326; 16/287; 16/297; 296/97.22
[58] Field of Search ..................................... 280/830, 834;
220/562, 581, 582, 4.12, 4.14, 329, 331,
332, 333, 334, 263, 264, 335, 86.1, 86.2,
324, 326; 292/141, 171, DIG. 25, DIG. 72;
296/97.22; 16/287, 297

[56] References Cited

U.S. PATENT DOCUMENTS

| 3,432,967 | 3/1969 | Simon .................................. 220/331 X |
| 4,527,825 | 7/1985 | Clouse ................................... 296/97.22 |
| 4,775,075 | 10/1988 | Kamin et al. ............................. 220/331 |
| 4,782,978 | 11/1988 | Appleby et al. ................... 296/97.22 X |
| 4,811,984 | 3/1989 | Hempel ................................ 296/97.22 |
| 4,971,382 | 11/1990 | Uhno .................................... 296/97.22 |
| 5,044,678 | 9/1991 | Detweiler .......................... 296/97.22 X |
| 5,437,491 | 8/1995 | Nedbal et al. ...................... 220/86.2 X |
| 5,520,431 | 5/1996 | Kapes et al. .......................... 296/97.22 |
| 5,533,766 | 7/1996 | Farber ............................... 296/97.22 X |

FOREIGN PATENT DOCUMENTS

| 42 42 228 | 6/1994 | Germany . | |
| 4400932 | 6/1994 | Germany ............................. 296/97.22 |
| 295 07 621 | 7/1995 | Germany . | |
| 57-99418 | 6/1982 | Japan .................................. 296/97.22 |
| 5-254354 | 10/1993 | Japan .................................. 296/97.22 |
| 2041070 | 9/1980 | United Kingdom ................ 296/97.22 |

Primary Examiner—Allan N. Shoap
Assistant Examiner—Nathan Newhouse
Attorney, Agent, or Firm—Schwartz & Weinrieb

[57] ABSTRACT

An inlet tray of a car tank, comprising a tray body and a tank cap, the tank cap being pivotally supported by the tray body at one end thereof and being adapted to be brought from a closed position to an opened position and vice versa, the tank cap further including locking or arresting elements cooperating with locking or arresting elements of the tank tray, the tank cap being supported such that upon releasing the locking or arresting elements the tank cap can be moved towards the locking or arresting elements of the tray body, and a spring element is provided between the tray body and tank cap which pretensions the cap towards the mentioned direction of movement.

20 Claims, 2 Drawing Sheets

INLET TRAY OF A CAR TANK

FIELD OF THE INVENTION

The present invention relates generally to automotive vehicles, and more particularly to an inlet tray of an automotive fuel tank.

BACKGROUND OF THE INVENTION

For some time it has become usual to manufacture, for automotive vehicles, inlet trays of a car tank, and tank caps for closing the trays, as vendor parts. The tray body is generally formed of synthetic material as one piece and is secured within the sheet metal hole of the car body in a suitable way, for instance by arresting. At 10 the bottom the pot-shaped tray body includes at least one hole for the passage of the pipe socket of the tank. The tank cap is connected to the tray body by means of a suitable hinge joint and is adapted to be locked and/or arrested together with the tray body on the opposite end. One distinguishes between manually arrested tank caps, tank caps which are adapted to be locked or released by means of push buttons, and tank caps which are adapted to be remotely released.

As already mentioned before, the tank caps are mounted pivotally on the tray body. The arrangement of the tank caps, however, makes certain space necessary. The tray bodies, therefore, are defined so as to be raised in the area in which the tank caps are linked. Thus, their provision requires a corresponding space in the car body.

Besides, they can only be arranged in the hole of the car body so as to be pivotal but they cannot be inserted in a straight-lined manner. Any conventional inlet tray of a car tank and tank cap have the disadvantage that the pivoting hinge fitting only allows a limited pivotal angle for the tank cap and, thus, makes accessibility to the pipe socket of the tank more difficult. An excessive strain of the tank cap in the opening direction may cause the tank cap to strike against the edge of the opening or the car body which may result in damage thereto.

OBJECT OF THE INVENTION

It is the object of the invention to provide an inlet tray of a car tank comprising a tank cap, the arrangement of which makes only a small space in the car body necessary.

SUMMARY OF THE INVENTION

According to the invention, the tank cap provided on the tray body is not only pivotally arranged about an axis, but on the contrary, as soon as the tank cap is disengaged or released it is capable of moving towards the arresting or locking means of the tray body. According to an embodiment of the invention, a hinge arm is preferably provided which is pivotally linked in the interior of the tray body. As soon as the tank cap has moved out of its closed position, that is, is outside the outer contour of the car body skin, it can move away from its linkage point and then be completely pivoted into the opened position. The aforementioned provision of the tank cap entails a number of advantages.

The particular linkage for mounting the tank cap in the tray body, according to which the tank cap is not only pivotal about an axis but also undergoes lateral movement, results in a reduction of the outer dimensions of the tray body in comparison with conventional structures. Moreover, the reduced structural dimensions allow the tray body to be arranged in the car body in a straight-lined manner without any pivoting movement.

The kinematics of the linkage of the tank cap allows a pivotal angle of more than 90° and, thus, provides better accessibility to the pipe socket of the tank possible.

According to the invention, the location of the hinge points allows the cap, especially round tank caps, to be widely and tightly connected to the tray body and, thus, exhibit high flexural stability in the opened position.

In addition, the described opening movement of the tank cap prevents the latter from getting into contact with the car body sheet. This prevents any damage to the car body or tank cap. Furthermore, the inventive linkage of the tank cap allows the latter to be shaped in a simple way. According to a development of the invention, it may be connected to the hinge arm by means of a snapping connection. By this arrangement, the tank cap can be painted together with the car body. In this way, exactly the same shade of color is obtained for the car body and the tank cap which is not always guaranteed when such components are painted separately.

According to a further development of the invention, the tank cap adjacent to the area of the locking or arresting means has a ramp-shaped deflection surface cooperating with a counter edge or counter surface of the tray body such that upon releasing the arresting or locking means, the tank cap is automatically pivoted about a predetermined angle away from the closed position under the biasing force of the spring. It can then be easily grasped by hand and be brought to the fully opened position.

BRIEF DESCRIPTION OF THE DRAWINGS

Various other objects, features, and attendant advantages of the present invention will be more fully explained hereinafter in the following detailed description which is to be read in connection with the accompanying of drawings in which like reference characters designate like or corresponding parts throughout the several views, and wherein.

DETAILED DESCRIPTION OF THE PREFERRED EMBODIMENT

Figure 1:
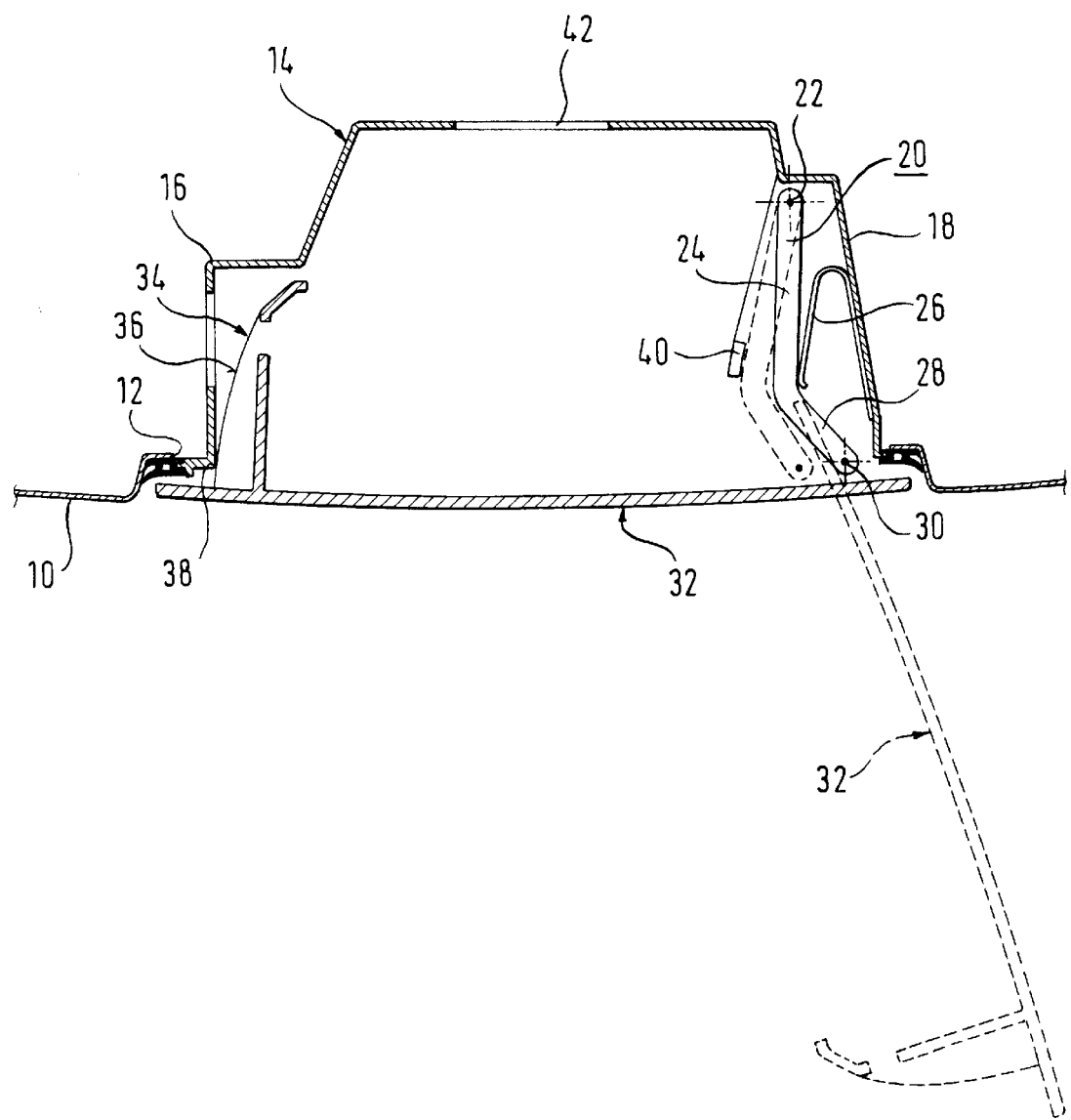
FIG. 1 schematically shows in section an inlet tray of a car tank having a cap mounted thereon in a manner according to the invention.

In FIG. 1 the car body skin of an automotive vehicle is shown at 10. It includes a slightly recessed portion 12 for the accommodation of a tray body 14. The tray body 14 is pot-shaped and has a substantially circular section. It comprises a first protrusion at 16 for the accommodation of arresting or locking means which are not shown. It includes a second relatively slight protrusion at 18. At the bottom of this protrusion 18, a hinge arm 20 is linked at 22. Between a first arm portion 24 of the hinge arm 20 and the associated wall of the protrusion 18 a hair-pin-like leaf spring 26 is arranged. To the more outer arm portion 28 of the hinge arm 20 bent towards the aperture edge a tank cap 32 is linked at 30. The linkage is not shown any further. At the end or side of the tank cap 32 which is disposed opposite the linkage 30, the tank cap 32 comprises a ramp-shaped portion 34 including a slightly bent ramp-shaped surface 36 which cooperates with a counter edge 38 of the tray body 14. In the area of the ramp-shaped portion 34, arresting or locking means are also provided which cooperate with the corresponding means of the tray body 14 so as to keep the tank cap 32 in the closed position shown in solid lines in FIG. 1. Upon releasing the arresting or locking means, for instance by actuating a push button, by remote-controlled activation or by opening the tank cap 32 manually, the cap 32 of FIG. 1, as a result of the biasing force of the leaf spring 26, moves leftward towards edge 38. This movement is partly deflected by edge 38 so as to cause the tank cap 32 to pivot outwardly, as demonstrated by the hinge arm 20 shown by dashed lines. The pivoting of the hinge arm 20 into the interior of the tray body 14 is restrict ed by stop means 40.

Automatic opening of the tank cap 32 upon releasing the arresting or locking means takes place only through a restricted angle in the described way. Subsequently, the tank cap 32 needs to be taken by hand and moved into the fully opened position, as shown in FIG. 1 by the dashed line. As can be seen, the cap 32 can be pivoted about an angle of more than 90° which improves the accessibility to the pipe socket of the car tank not shown. The pipe socket of the car tank is led through an aperture 42 at the bottom of the tray body 14.

The hinge arm 20 is adapted to be connected to the tray body 14 by means of a snapping connection. The tank cap 32 is adapted to be connected to the hinge arm 20 by means of a snapping connection as well. The hinge arm 20 may be preassembled together with the tray body 14 before inserting it straight-lined into the opening 12 of the car body 10. The arresting means of the tray body 14 within the opening 12 is not described any further since it is known per se. The tank cap 32 may be mounted at a later date after having been painted together with the car body.

Figure 2:
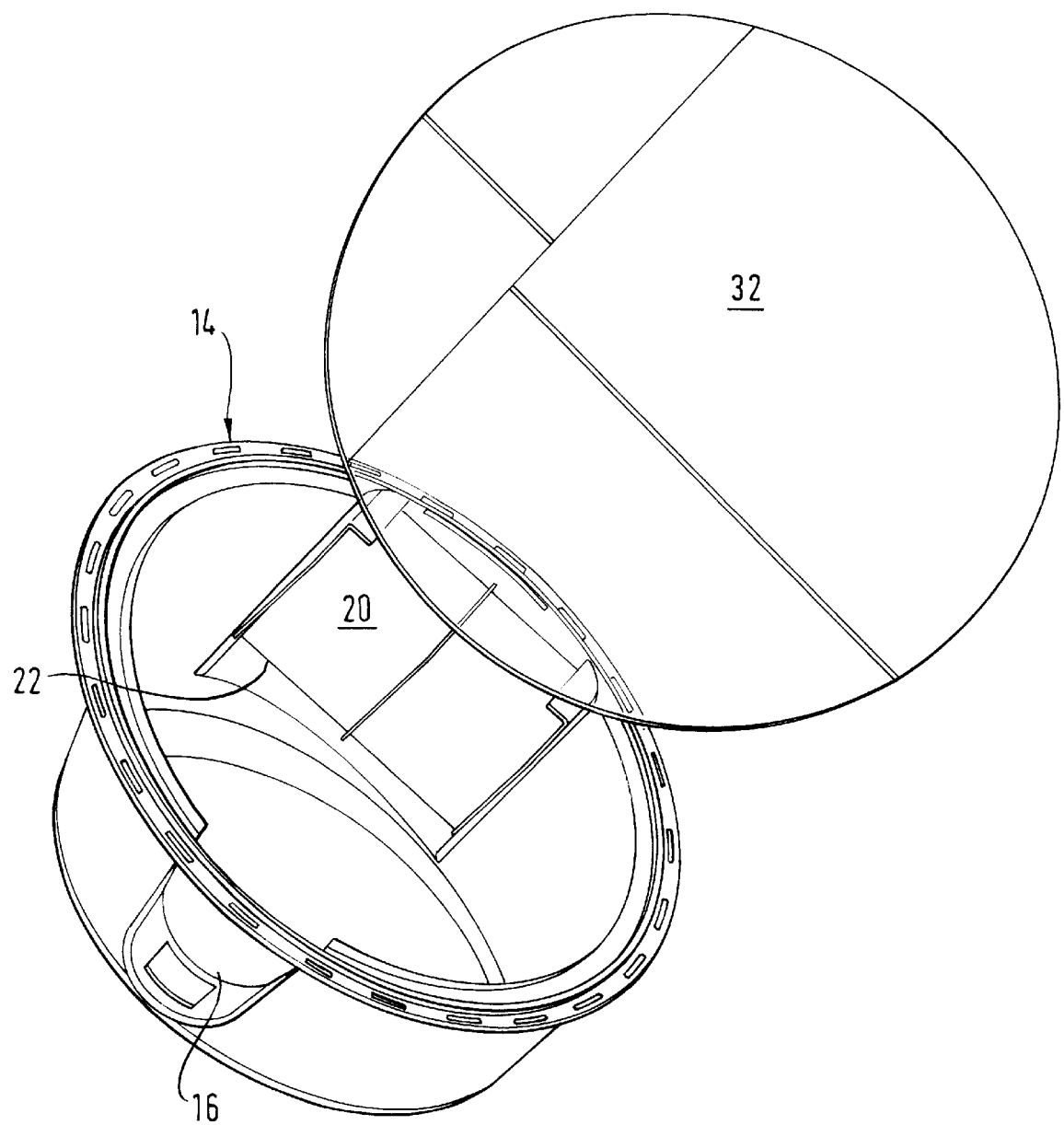
FIG. 2 shows in a perspective view the structure according to FIG. 1, with the tank cap being opened.

In the drawing according to FIG. 2, the tank cap 32 is shown in the opened position and supposed to be transparent. There is shown the hinge arm 20 which is mounted pivotally at 22. The hinge arm 20 has a relatively large width. It, therefore, is robust and capable of withstanding the strains occurring under the influence of pressure or a stroke which cannot always be avoided while filling up the automotive fuel tank.

Obviously, many modifications and variations of the present invention are possible in light of the above teachings. It is therefore to be understood that within the scope of the appended claims, the present invention may be practiced otherwise than as specifically described herein.

What is claimed is:

1. A system for mounting a closure member upon a support body, comprising:
   a closure member;
   a support body having an opening defined therein which is adapted to be covered by said closure member;
   said closure member is mounted upon said support body for movement between an opened position at which said opening defined within said support body is uncovered, and a closed position at which said closure member covers said opening defined within said support body;
   latching means defined between said support body and a first side portion of said closure member for maintaining said closure member in a latched state at said closed position with respect to said support body whereby said closure member covers said opening defined within said support body, and for releasing said closure member such that said closure member is disposed in an unlatched state and can be moved to said opened position; and
   mounting arm means pivotally connected at one end thereof to said support body and pivotally connected at another end thereof to a second side portion of said closure member for mounting said closure member upon said support body such that when said latching means is released so as to permit said closure member to be moved from said latched closed position to said unlatched opened position, said closure member moves in a direction extending substantially from said second side portion thereof toward said first side portion thereof and then away from said closed position toward said opened position.

2. The system as set forth in claim 1, wherein:
   said support body comprises an inlet tray of an automotive fuel tank; and
   said closure member comprises an automotive fuel tank cap.

3. The system as set forth in claim 1, further comprising:
   spring-biasing means interposed between said support body and said mounting arm means for biasing said mounting arm means in said direction extending from said second side portion of said closure member toward said first side portion of said closure member.

4. The system as set forth in claim 3 further comprising:
   stop means disposed upon said support body for limiting said movement of said mounting arm means in said direction extending from said second side portion of said closure member toward said first side portion of said closure member under the biasing influence of said spring-biasing means.

5. The system as set forth in claim 3, wherein:
   said first side portion of said closure member comprises an arcuate shaped portion for biasingly engaging an edge portion of said support body defining said opening within said support body such that as said mounting arm means is biased in said direction by said spring-biasing means, said arcuate shaped portion of said closure member and said edge portion of said support body cooperate to bias said closure member outwardly away from said closed position with respect to said support body and toward said opened position with respect to said support body.

6. The system as set forth in claim 3, wherein:
   said spring-biasing means comprises a substantially U-shaped leaf spring comprising a pair of legs wherein a first one of said pair of legs is engaged with said mounting arm means and a second one of said pair of legs is engaged with said support body.

7. The system as set forth in claim 1, wherein:
   said mounting arm means has a first portion thereof pivotally connected to said support body, and a second portion thereof pivotally connected to said closure member, said first and second portions of said mounting arm being disposed at a predetermined obtuse angle with respect to each other.

8. A system for mounting a closure member upon a support body, comprising:
   a support body having an opening defined therein;
   closure means operatively associated with said support body for covering said opening of said support body when said closure means is disposed at a closed position with respect to said support body, and for uncovering said opening of said support body when said closure means is disposed at an opened position with respect to said support body;
   releasable latching means defined between said support body and a first side portion of said closure means for maintaining said closure means at a first latched position at which said closure means is disposed at said closed position with respect to said support body, and for releasing said closure means to a second unlatched position from which said closure means can be moved to said opened position; and mounting arm means pivotally connected at one end thereof to said support body and pivotally connected at another end thereof to a second side portion of said closure means for mounting said closure means upon said support body such that when said latching means releases said closure means so as to permit said closure means to move from said latched closed position to said unlatched opened position, said closure means undergoes compound movement comprising a first sidewise movement in a direction extending substantially from said second side portion thereof toward said first side portion thereof and subsequently a second movement away from said closed position toward said opened position.

9. The system as set forth in claim 8, wherein:

said mounting arm means comprises a first portion connected to said support body, and a second portion, integral with said first portion, connected to said closure means wherein said first and second portions of said mounting arm means are disposed at a predetermined obtuse angle with respect to each other.

10. The system as set forth in claim 8, further comprising:

spring-biasing means interposed between said support body and said mounting arm means for biasing said mounting arm means in said sidewise direction extending from said second side portion of said closure means toward said first side portion of said closure means.

11. A system as set forth in claim 10, further comprising:

stop means disposed upon said support body for limiting said movement of said mounting arm means in said sidewise direction extending from said second side portion of said closure means toward said first side portion of said closure means under the biasing influence of said spring-biasing means.

12. A system as set forth in claim 10, wherein:

said first side portion of said closure means comprises an arcuate-shaped portion for biasingly engaging an edge portion of said support body which defines said opening within said support body such that as said mounting arm means is biased in said sidewise direction by said spring-biasing means, said arcuate-shaped portion of said closure means and said edge portion of said support body cooperate together so as to cause said closure means to undergo said second movement away from said closed position with respect to said support body and toward said opened position with respect to said support body.

13. The system as set forth in claim 10, wherein:

said spring-biasing means comprises a substantially U-shaped leaf spring comprising a pair of legs wherein a first one of said pair of legs is engaged with said mounting arm means and a second one of said pair of legs is engaged with said support body.

14. The system as set forth in claim 8, wherein:

said support body comprises an inlet tray of an automotive fuel tank; and said closure means comprises an automotive fuel tank closure cap.

15. A system for mounting an automotive fuel tank closure cap upon an automotive fuel tank inlet tray, comprising:

an automotive fuel tank inlet tray having an opening defined therein which is adapted to be covered by a closure;

an automotive fuel tank closure cap mounted upon said automotive fuel tank inlet tray for movement between a closed position at which said closure cap covers said opening defined within said inlet tray, and an opened position at which said closure cap uncovers said opening defined within said inlet tray;

releasable latching means defined between a first side portion of said inlet tray and a first side portion of said closure cap for maintaining said closure cap at a latched position which corresponds to said closed position with respect to said inlet tray at which said closure cap covers said opening defined within said inlet tray, and for releasing said closure cap to an unlatched position such that said closure cap can be moved toward said opened position at which said closure cap uncovers said opening defined within said inlet tray; and mounting arm means pivotally connected at one end thereof to a second side portion of said inlet tray and pivotally connected at another end thereof to a second side portion of said closure cap for mounting said closure cap upon said inlet tray such that when said latching means releases said closure cap so as to permit said closure cap to move from said closed and latched position toward said unlatched and opened position, said closure cap undergoes compound movement with respect to said inlet tray comprising a first sidewise movement in a direction extending substantially from said second side portion thereof toward said first side portion thereof, and subsequently, a second movement away from said closed position with respect to said inlet tray toward said opened position with respect to said inlet tray.

16. The system as set forth in claim 15, wherein:

said mounting arm means comprises a first portion connected to said inlet tray, and a second portion, integral with said first portion, connected to said closure cap wherein said first and second portions of said mounting arm means are disposed at a predetermined obtuse angle with respect to each other.

17. The system as set forth in claim 15, further comprising:

spring-biasing means interposed between said second side portion of said inlet tray and said mounting arm means for biasing said mounting arm means in said sidewise direction extending from said second side portion of said inlet tray toward said first side portion of said inlet tray.

18. The system as set forth in claim 17, further comprising:

stop means mounted upon said inlet tray for engaging said mounting arm means and thereby limiting said pivotal movement of said mounting arm means with respect to said inlet tray under the influence of the biasing force of said spring-biasing means.

19. A system as set forth in claim 17, wherein:

said first side portion of said closure cap comprises an arcuate-shaped portion for biasingly engaging an edge portion of said inlet tray which defines said opening within said inlet tray such that as said mounting means arm is biased in said sidewise direction by said spring-biasing means, said arcuate-shaped portion of said closure cap and said edge portion of said inlet tray cooperate together so as to cause said closure cap to undergo said second movement away from said closed position with respect to said inlet tray and toward said opened position with respect to said inlet tray.

20. The system as set forth in claim 17, wherein:
said spring-biasing means comprises a substantially U-shaped leaf spring comprising a pair of legs wherein a first one of said pair of legs is engaged with said mounting arm means and a second one of said pair of legs is engaged with said inlet tray.

\* \* \* \* \*